United States Patent [19]

Levy

[11] Patent Number: 5,538,746
[45] Date of Patent: Jul. 23, 1996

[54] PROCESS FOR FILTERING WATER PRIOR TO CARBONATION

[76] Inventor: Ehud Levy, 5933 Peachtree Industrial Blvd. Bldg. B, Norcross, Ga. 30092

[21] Appl. No.: 261,998

[22] Filed: Jun. 17, 1994

[51] Int. Cl.[6] .................................. A23L 2/78; C02F 1/42
[52] U.S. Cl. .......................... 426/477; 426/590; 210/664; 210/750
[58] Field of Search ...................................... 426/477, 590; 210/664, 750

[56] References Cited

U.S. PATENT DOCUMENTS

| | | |
|---|---|---|
| 1,304,206 | 5/1919 | Rudorf . |
| 1,343,927 | 6/1920 | Massatsch . |
| 2,710,255 | 6/1955 | Blaricom et al. . |
| 2,882,243 | 4/1959 | Milton . |
| 3,130,007 | 4/1964 | Breck . |
| 3,181,231 | 4/1965 | Breck . |
| 3,210,912 | 10/1965 | Peakeet et al. . |
| 3,312,616 | 4/1967 | Ulmer et al. ............................ 210/664 |
| 3,535,235 | 10/1970 | Schouw . |
| 3,817,878 | 6/1974 | Clemens et al. . |
| 3,950,253 | 4/1976 | Stern . |
| 3,963,620 | 6/1976 | Vor . |
| 4,049,550 | 9/1977 | Obidniak . |
| 4,213,874 | 7/1980 | Williams et al. . |
| 4,312,754 | 1/1982 | LaFontaine . |
| 4,476,224 | 10/1984 | Adler . |
| 4,497,348 | 2/1985 | Sedam . |
| 4,509,569 | 4/1985 | Adolfsson . |
| 4,514,994 | 5/1985 | Mabb . |
| 4,597,509 | 7/1986 | Pereira . |
| 4,609,466 | 9/1986 | McCausland et al. . |
| 4,642,192 | 2/1987 | Heskett . |
| 4,708,827 | 11/1987 | McMillin . |
| 4,957,749 | 9/1990 | Prieels et al. . |
| 4,996,073 | 2/1991 | Copeland et al. . |
| 5,021,250 | 6/1991 | Ferguson .................................. 426/231 |
| 5,071,551 | 12/1991 | Muramatsu et al. . |
| 5,071,664 | 12/1991 | Brown . |
| 5,087,469 | 2/1992 | Acree . |
| 5,156,828 | 10/1992 | Degnan et al. . |
| 5,178,768 | 1/1993 | White, Jr. . |
| 5,194,279 | 3/1993 | Okel . |

*Primary Examiner*—Helen Pratt
*Attorney, Agent, or Firm*—Penrose Lucas Albright

[57] ABSTRACT

A hydrated aluminosilicate material is used as a filtration media for filtering, including the removal of dissolved oxygen, water received by a carbonation apparatus, the particular hydrated aluminosilicate material having been crystallized under ultraviolet light to produce pore sizes of 75Å to 200Å at ambient temperatures (20° C.–35° C.) and in a low relative humidity (5%–20%).

9 Claims, 2 Drawing Sheets

PROCESS FOR FILTERING WATER PRIOR TO CARBONATION

FIELD OF THE INVENTION

The invention relates to the filtration of water which is to be carbonated and dispensed as a carbonated water or, having had a beverage syrup added thereto, is dispensed as a carbonated beverage. More particularly, the invention relates to a method, apparatus, filtration media and process for making the media, wherein water is filtered before it is carbonated by a filtration media that removes dissolved oxygen and other dissolved gases from the water.

BACKGROUND OF THE INVENTION

Fountain beverages have been installed in bars, restaurants, drug stores and other locations on a worldwide basis which are provided with apparatus for carbonating water received from a source of potable water, and mixing it with a flavored syrup to make a variety of soft drinks as well as alcoholic beverages. However, the chemistry of water differs considerably from place to place; important differences exist in the amounts of dissolved oxygen, pH values, as well as in a variety of other substances dissolved in and carried by the water. Although water may be treated at point of use for the purpose of removing or neutralizing contaminants in the local water supply, the various known and more frequently used modes of water treatment do little to improve the water for subsequent carbonation. This is true, in part, because dissolved oxygen is not generally considered undesirable in a water supply. Fresh clear water is normally full of oxygen and a balance is maintained by the biochemical functions of aquatic plants and animal life. Moreover, it is common for municipal water, after filtration, to be passed through an aerator (either in the form of fountains or water jets) to saturate it with oxygen before it is treated with chlorine. However, a substantial percentage of fountain services in the United States produce less than entirely satisfactory carbonated drinks due primarily to high amounts of dissolved oxygen in the water. Thus, for carbonation of water, dissolved oxygen is undesirable.

Moreover, the problem appears to be aggravated by other substances dissolved or carried in the water. It may have suspended material, such as clay particles, a large number of different dissolved solids, bacteriological and biological contaminants, chemicals such as phenols which, in a few parts per million, may be associated with traces of chlorine. Iron, manganese, lead and nitrogen are frequently found in small quantities in water supplies. The presence of calcium carbonate indicates water hardness, which is due primarily to the presence of dissolved calcium and manganese salts. The result is that carbonated drinks may be less tasty because of the reduced carbonation, and therefore less desirable to consumers. It is not uncommon, of course, to provide an apparatus for softening water at point of use. One method of softening water is to pass it through a granular zeolite which may be a natural occurring or artificially hydrated aluminum silicate, wherein the water softening action occurs due to the zeolite replacing calcium ions from the water with the zeolite's sodium ions. However, for the purposes of carbonation, sodium is considered undesirable and should therefore be removed from, not added to, the water prior to carbonation.

SUMMARY OF THE INVENTION

I have discovered that particular hydrated aluminosilicate materials, unique types of zeolite Y, can satisfactorily and effectively remove dissolved oxygen and other gases and chemicals such as sodium dissolved in the water so that the water's carbonation at soda fountains, which have been adversely affected by the quality of the drinking water, is improved markedly. A hydrated aluminosilicate material which has been used successfully for this process is made from 21% by weight of alumina hydrate $Al(OH)_3$ and 68% to 72% sodium silicate $Na_2O$ 3.22–2.88 $SiO_2$, which is mixed with 11% to 14% by weight sodium hydroxide NaOH in a 5% concentration, blended into a slurry that is filtered, washed with clean water, permitted to gel, heated with steam to initiate crystallization, and laid over a flat bed wherein crystals are formed under ultraviolet radiation (wave lengths of 2000Å–3900 Å) at ambient temperature (20° C.–35° C.) in a low relative humidity (5%–20%) atmosphere.

The alumina hydrate which is used has particle sizes of about five microns for about 75% of the material, and fifty microns for about 25% of the material. Dispersed alumina can also be used.

Although after crystals have commenced to form, ultraviolet radiation is no longer necessary and the crystallization can be completed without being subjected to such radiation, it is preferred that radiation be continued until crystallization of the zeolite is complete—at least to having the desire pore sizes. Preferably, relative intense ultraviolet radiation is provided by ultraviolet lamps. Except for the initial heating of the material by steam, its temperature is continuously maintained in a temperature range of 20° C. to 35° C., preferably in the higher temperatures of that range, 32° C. to 35° C. When the crystals are fully formed, they are washed with pure water and placed in a bath of potassium chloride, wherein the potassium displaces the sodium in the zeolite. The resulting zeolite is again washed with pure water, dried and screened to produce a particle size of 8 to 60 mesh, preferably 24×40 mesh, which is packed in polyglass cylinders or cartridges that are mounted preferably immediately before the carbonation apparatus of a fountain dispensing machine. If the zeolite product is subsequently neither heated nor packed too tightly, it retains surprising high pore diameters and pore volumes as well as a large effective internal surface areas. The first five thousand gallons of water filtered through the hydrated aluminosilicate material had its dissolved oxygen largely, and in fact virtually entirely, removed, and the carbonation process of the apparatus is substantially improved, whereby carbonated water and beverages dispensed therefrom are equal to or better than beverages from comparable fountain dispensing machinery in areas wherein adequate carbonation of the water supply has not been considered a problem.

Filtration through the same filter after five thousand gallons continues to remove dissolved oxygen whereby it may still remove up to 50% of the oxygen in the water after as much as fifteen thousand gallons of water have passed through the filter. The capacity of the zeolite in accordance with the invention for oxygen removal is between fifteen and forty-five ounces per cubic foot of the filtration media. At the same time, the filter removes virtually all sodium ions in the water. If hydrogen sulphide is present, it is also removed.

The improved result provided by the invention, including the filtering process, the apparatus, and method of making a zeolite for use in the process, as well as the structure and composition of the zeolite, as such, are the primary objects of the invention. However, other objects, adaptabilities and capabilities of the invention will be appreciated, as the description progresses, reference being had to the accompanying drawing in which:

DETAILED DESCRIPTION OF THE PREFERRED EMBODIMENTS

Figure 1:
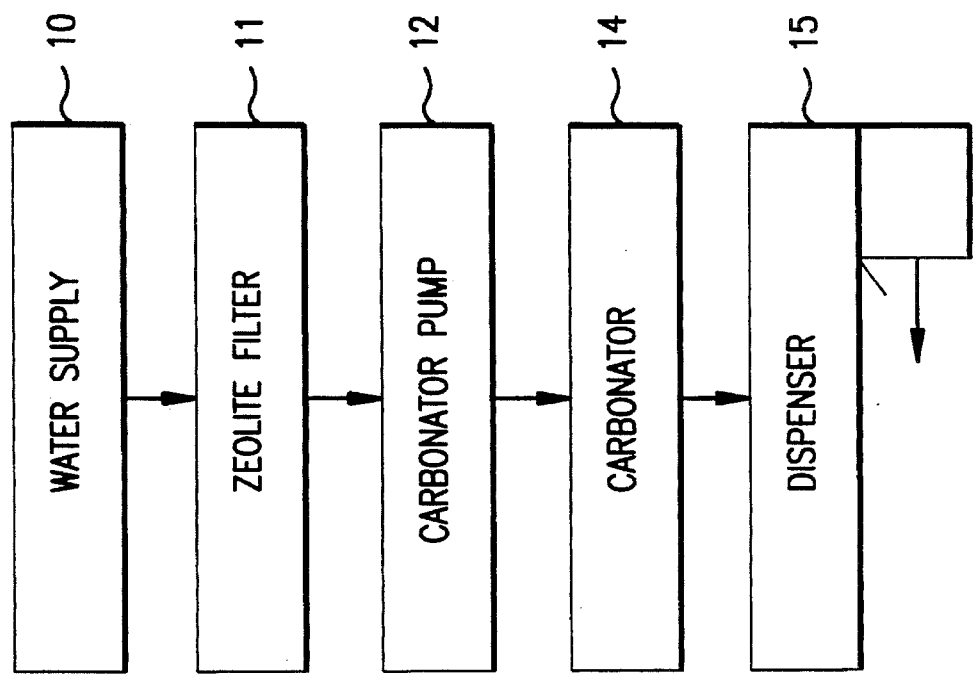
FIG. 1 is a schematic representation of a post-mix carbonated beverage system, including a zeolite filter for removing dissolved oxygen and other dissolved gases and substances from the water supply prior to carbonation according to the present invention.

Referring now to the accompanying drawings, FIG. 1 illustrates a post-mix carbonated beverage system which includes a filter 11 for rapid treatment of water from a water supply 10 before the water is received by the carbonation system comprising a carbonator pump 12 and a carbonator 14. Carbonated water is received from carbonator 14 by a dispenser 15. Between carbonator 14 and dispenser 15, a reservoir or a filter, or both, are sometimes provided. They are not, however, essential to practice the present invention.

With the usual type of carbonation system, it is customary for water to be conveyed to a carbonator from any suitable source via an appropriate pumping or pressurizing arrangement which is often powerful pumps of the municipal water system. Once the water reaches the carbonator, it is carbonated with $CO_2$ under a pressure which is usually in the range of thirty to seventy-five pounds per square inch. From carbonator 14, carbonated water is supplied to a dispenser 15, where it is blended with a beverage syrup and dispensed as a high quality beverage. In general, the mixture of carbonated water and syrup is in a proportion of five to one, although other desired proportions can be selected as long as absolute uniformity and high quality result. The $CO_2$, which is normally dissolved under a pressure of two to five atmospheres in carbonator 14, causes the effervescence in the carbonated beverages received from dispenser 15. Depending upon the syrups, the syrups may also be added to carbonator 14 before being received by dispenser 15. In such case, it is customary for a soft drink fountain to have several dispensers 15, one for each flavor, and one for carbonated water without flavor.

Hydrated aluminosilicate material filter 11 normally comprises a volume of about one-half to two cubic feet of zeolite in accordance with the invention. It can be placed in polyglass cylinders or cartridges of types well known to the trade and is capable of treating 5,000 gallons or more of water. Carbonation is improved as a result of the filtration through the zeolite by a substantial amount, 1.9 to 3.7 volumes of carbonation, for example. In a typical system, influent water was found to have from 5.6 mg/L to 6.2 mg/L dissolved oxygen. Effluent water from filter 11, however, contained virtually no measurable amount of dissolved oxygen after 5000 gallons at a flow rate of three gallons per minute.

In general, zeolites are understood to be a group of crystalline, hydrated aluminosilicates of monovalent or polyvalent bases which are able to give off their water without any changes in crystal structure, and adsorb other compounds in place of the water removed. They are also capable of cation exchange.

Known zeolites are often formed by first a ripening or aging process for periods from several hours up to about nine days at ambient temperatures, that is, temperatures between 13° C. and 38° C. Following the ambient temperature or digestion step, the mixture is crystallized, which is accomplished generally at a temperature which may be the ambient temperature or a much higher temperature. For example, crystallization may take place at temperatures from 20° C. to as high as 125° C. For commercial purposes, crystallization is usually effected at temperatures in the range of about 80° C. to 125° C. Not only is it more rapid, but also at lower temperatures, the crystals that form are often smaller in size than those formed at a higher temperature. However, with the instant invention, the crystals should, both in the aging and digestion step, and also in the crystallization step as well as thereafter, be maintained, except for a relatively short time before crystallization, at essentially ambient temperatures and, also importantly, at a low relative humidity.

The chemical formula for a zeolite known as zeolite Y, expressed in terms of moles of oxides, may be written as:

$0.9 \pm 0.2\ Na_2O:Al_2O_3:wSiO_2:xH_2O$, wherein w is a value greater than about 3 up to about 6, and x may be a value up to about 9. Such zeolite is disclosed along with a number of examples in U.S. Pat. No. 3,130,007, of D. Breck, which issued Apr. 21, 1964. Zeolite Y is a particularly effective adsorbent of oxygen and the zeolite of the instant invention has a chemical composition which falls within the broad definition of zeolite Y.

Chemically the hydrated aluminosilicate material of instant invention which comprises by weight 21% alumina trihydrate $Al_2O_3 \cdot 3H_2O$ and 68%–72% sodium silicate $Na_2O \cdot 2.88$–$3.22\ SiO_2 + 2$–$4\ H_2O$, the remaining percentage being initially sodium hydroxide NaOH, the sodium in the hydrated aluminosilicate zeolite subsequently being exchanged for a potassium. However, the pore sizes are much larger than in known zeolite Y's, having typical diameters of between about 75Å and 200Å. Instead of applying heat (except for a relatively short period before, or to commence) crystallization of the zeolite particle formation of the filtration media from its initial gel form, it is exposed to relatively intense ultraviolet radiation in the range of 2000Å to 3900Å wavelengths, or to natural sunlight. Use of artificial ultraviolet radiation causes a much more rapid crystallization than sunlight where three to six weeks may be required to produce large crystals. Moreover, it is, of course, difficult to control relative humidity if natural sunlight is used, unless the material is crystallized under glass, whereby the intensity of the radiation received by the material is reduced. Although both methods are operable, in accordance with the invention, hydrated aluminosilicate materials produced by crystallization under ultraviolet lamps are considered distinct from that produced in accordance with the invention under sunlight in that the former's pores are more uniform in size and the crystalline structure of the zeolite is more predictable and has relatively less variations. An average pore diameter as great as 180Å and average pore volume of 0.798 mL/g have been achieved with a extremely high uniformity of pores.

The invention is illustrated by the following Example:

EXAMPLE I

Commercial water glasses composed of 8.9% by weight $Na_2O$ and 28.7% by weight $SiO_2$, the remainder $H_2O$, were blended with 21% of $Al(OH)_3$ in crystalline powder form. Eleven percent by weight of sodium hydroxide (0.929 mols of $Na_2O$ per liter) was added and mixed until homogeneous. The mixture was transferred to a crystallization tank where it was cooked with a steam batch (100° C.) for 16 hours. The resulting gel was transferred to a filter, filtered and washed with 200 liters of clean water until pH of 8.6 was measured. The gel was then placed into two inch deep Pyrex trays, the depth of the gel therein being about one inch (2.5 cm). Thereafter, the gel was exposed to continuous and relatively intense ultraviolet radiation from both above and below the trays while crystallization proceeded for seven days until crystallization was complete. The relative humidity of the air surrounding the trays was maintained between 5% and 20%. Thermocouples were placed in the gel to monitor its temperature which was held at an average temperature between 32° C. and 3520 C. by automatic cooling apparatus that cooled the gel for the first two days by air to 32° C. upon the temperature of the material reaching 35° C., and therefore the same effect was achieved by adding water.

The resulting zeolite crystals were ground and screened to produce zeolite particles between 8 and 60 mesh. Such crystals were placed in 36 liters of 5% solution of KCl for 0.2 hours which was maintained at a temperature of 20° C. to effect a complete substitution of potassium for sodium in the hydrated aluminosilicate material.

The hydrated aluminosilicate material product had a total pore volume of 0.73% cc per gram and a pore area of 175 square meters per gram. The pore diameters were 100Å to 180Å, peaking at 151Å.

Using twenty kilograms of the above media to filter municipal water at a flow rate of three gallons per minute, the following removal of dissolved oxygen occurred:

| Gallons of water | 100 | 500 | 2000 | 3000 |
|---|---|---|---|---|
| Influent water(dissolved oxygen) | 5.6 mg/L | 6.2 mg/L | 6.1 mg/L | 5.7 mg/L |
| Effluent water(dissolved oxygen) | 0 | 0 | 0 | 0 |

Thereafter the water was received in a carbonator where the volumes of carbonation were increased from 1.9 (without $O_2$ removed) to 3.9 ($O_2$ removed).

EXAMPLE II

Figure 2:
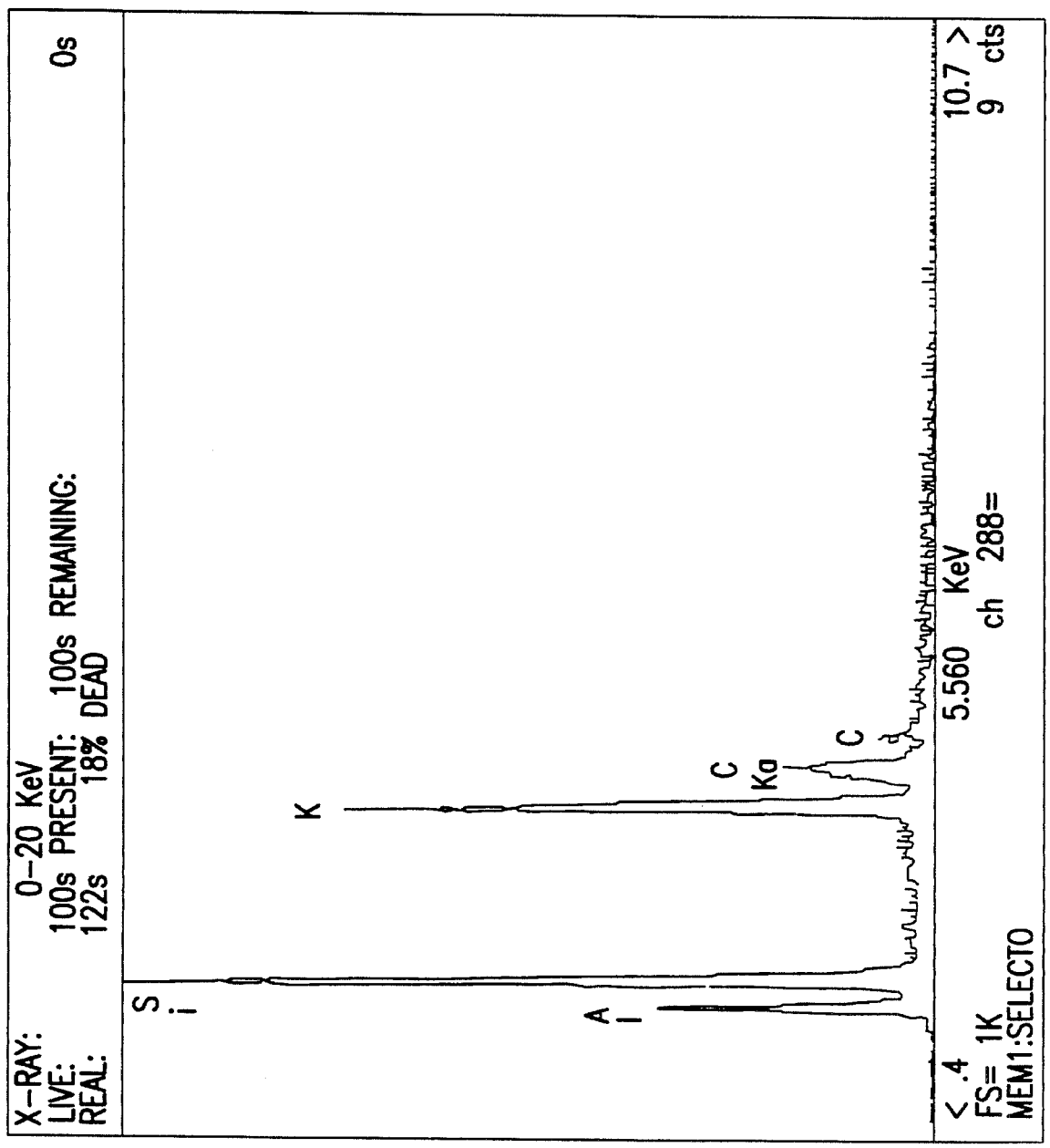
FIG. 2 represents a SEN/EDS spectrum of a dry zeolite sample from Example II described herein.

Commercial sodium silicate in the form of a ratio of 2.18% by weight $Na_2O$ and 32% $SiO_2$ by weight was mixed with 2% CaO by weight. 21% $Al(OH)_3$ by weight was added and the mixture was blended for one hour. Eleven percent by weight of a 5% solution of NaOH was added which was stirred until homogeneous. The mixture was then held in a tank for six hours and transferred to a tank wherein it was cooked with steam at 100° C. for three hours. Thereafter, the process was continued as set forth above for Example I. The SEM/EDS spectrum of a dry hydrated aluminosilicate material sample from this Example is illustrated in FIG. 2. It will be noted that on a dry basis, the results were 58.7% silicon oxide, 21% alumina, 17% potassium, and 1.5% calcium. It is considered that the remaining 1.8% was primarily water which had not been entirely removed from the sample and impurities either in the chemicals or which entered via the water used in the process.

The zeolite product compared closely insofar as pore volume, pore area, and pore diameters are concerned with Example I, and the same is true insofar as the effectiveness of the Example to filter dissolved oxygen from municipal water.

The crystallization or formation of the hydrated aluminosilicate material in accordance with the invention can be time consuming. Both the time required to produce the crystals and their quality appears to be affected to a substantial degree by the purity of the initial material, the temperature at which the process is carried out, and the intensity of the ultraviolet radiation. Humidity control is also important. Two to ten weeks may elapse before the crystals are completely grown, uniform and stable. Their pore diameters and volumes, if subsequently heated, are substantially reduced. The same occurs if too much pressure is applied to the hydrated aluminosilicate material.

It is not entirely clear why the hydrated aluminoslicate material, which is produced in accordance with the invention, has the capacity to adsorb as much of the oxygen dissolved in water as it does. If the same hydrated aluminosilicate material is subsequently heated to temperatures substantially above ambient temperatures, its capacity to adsorb dissolved oxygen in water at flow rates of between one and seven gallons per minute is substantially reduced. However, it is theorized that in the crystallization of the hydrated aluminosilicate material under ultraviolet light, crosslinking by shared oxygen atoms of the three dimensional frameworks of $SiO_4$ and $AlO_4$ tetrahedrons is incomplete, or that the potassium cations are preferentially selective for oxygen atoms. In either event, or for whatever reason, particles made and used in accordance with the invention exhibit a surprising capacity to remove large amounts of dissolved oxygen from the water that is a prime cause for reduced carbonation in various areas of the United States.

In trials of the invention, as indicated above, a filtration media comprised of between 1 and 1.5 cubic feet of hydrated aluminosilicate material media dramatically improved the carbonation of water which had a considerable amount of dissolved oxygen in its water supply. In at least one test, over 22,000 gallons were involved wherein the flow rate was one to seven gallons per minute, and the zeolite filter continued to remove dissolved oxygen from the water, albeit at a reduced rate of about fifty percent.

Although I have described the preferred embodiments of my invention, it is to be understood that it is capable of other adaptations and modifications in the scope of the appended claims.

Having thus disclosed my invention, what I claim as new and desire to secure by Letters Patent of the United States is:

1. A process for filtration of water to improve its carbonation either in the form of potable carbonated water, or as a carbonated beverage formed by mixing said carbonated water with a beverage syrup, which comprises the step of performing the filtration of the water before it is carbonated by filtering said water through a hydrated aluminosilicate material to remove dissolved oxygen from the water prior to carbonation.

2. A process in accordance with claim 1, wherein said hydrated aluminosilicate material is in a container of one-half cubic foot to three cubic feet capacity.

3. A process in accordance with claim 1, wherein the surface area of said hydrated aluminosilicate material is approximately 120 square meters per gram or more.

4. A process in accordance with claim 1, wherein chemical composition of said hydrated aluminosilicate material is the same as zeolite Y.

5. A process in accordance with claim 1, comprising the further steps of carbonating said filtered water in a container and conveying said carbonated water to a dispenser, said dispenser having a mechanism for adding beverage syrup to said carbonated water.

6. A process in accordance with claim 1, comprising the further step of mixing carbon dioxide with said water which has been filtered through said hydrated aluminosilicate material in a carbonator under a pressure of about 2 to 5 atmospheres.

7. A process in accordance with claim 6, comprising the additional step of mixing a beverage syrup with said carbonated water while it is in said carbonator under a pressure of about 2 to 5 atmospheres.

8. A process for carbonation of water which comprises a step of first filtering the water with a hydrated aluminosilicate material having the same chemical composition as zeolite Y.

9. A process in accordance with claim 8, wherein the pores of said hydrated alumnosilicate material have diameters of at least about 75Å and said hydrated aluminosilicate material adsorbs dissolved oxygen from said water before it is carbonated.

* * * * *